US005701418A

United States Patent [19]
Luitje

[11] Patent Number: 5,701,418
[45] Date of Patent: Dec. 23, 1997

[54] INTRA-VEHICULAR LAN AND METHOD OF ROUTING MESSAGES ALONG IT USING HASH FUNCTIONS

[75] Inventor: William V. Luitje, Ann Arbor, Mich.

[73] Assignee: Chrysler Corporation, Auburn Hills, Mich.

[21] Appl. No.: 221,822

[22] Filed: Mar. 31, 1994

[51] Int. Cl.$^6$ ..................................................... G06F 12/10
[52] U.S. Cl. ............................. 395/200.16; 395/421.06
[58] Field of Search ........................ 395/200.02, 200.15, 395/200.16, 200.1, 828, 829, 830, 849, 412, 414, 415, 421.03, 421.05, 421.06, 421.11, 416, 417; 364/131, 147, 424.01, 424.05, 425

[56] References Cited

U.S. PATENT DOCUMENTS

| | | | |
|---|---|---|---|
| 4,104,731 | 8/1978 | Grudowski et al. | 395/824 |
| 4,517,637 | 5/1985 | Cassell | 364/138 |
| 4,652,853 | 3/1987 | Tagami et al. | 307/10.1 |
| 4,680,700 | 7/1987 | Hester et al. | 395/416 |
| 4,972,367 | 11/1990 | Burke | 395/600 |
| 5,053,964 | 10/1991 | Mister et al. | 364/424.01 |
| 5,090,012 | 2/1992 | Kajiyama et al. | 370/85.3 |
| 5,095,480 | 3/1992 | Fenner | 370/94.1 |
| 5,113,410 | 5/1992 | Hamano et al. | 375/219 |
| 5,117,458 | 5/1992 | Takaragi et al. | 380/4 |
| 5,414,704 | 5/1995 | Spinney | 370/60 |
| 5,428,526 | 6/1995 | Flood et al. | 364/141 |
| 5,438,506 | 8/1995 | Oho et al. | 364/138 |
| 5,499,374 | 3/1996 | Di Giulio et al. | 395/728 |
| 5,566,305 | 10/1996 | Levenstein | 395/299 |

OTHER PUBLICATIONS

Sprugnoli, Renzo, Perfect Hashing Functions: A Single Probe Retrieving Method for Static Sets, *Communications of the ACM*, vol. 20, No. 11 (Nov. 1977).

Jaeschke, G., Reciprocal Hashing: A Method for Generating Minimal Perfect Hashing Functions, *Communications of the ACM*, vol. 24, No. 12 (Dec. 1981).

Mini Micro Conference Record, 8 Nov. 1983–11 Nov. 1983 San Francisco US, pp. 1–18, Coleman et al 'The Implementation of Ethernet/IEEE 802.3 in VLSI' *p. 4, right col., paragraph 2—p. 5, left col., paragraph 2*.

Radio Fernsehen Elektronik, vol. 41, No. 112, Dec. 1992 Berlin DE, pp. 838–841, Wolff 'Halbleiterkonzepte für die Automobielelektronik' *p. 838, right col., paragraph 2—p. 839, right col., paragraph 4; figures 2, 3*.

IEEE Transactions on Communication Technology, vol. 40, No. 110, Oct. 1992 New York US, pp. 1570–1573, Jain 'A Comparison of Hashing Schemes for Address Lookup in Computer Networks' *p. 1570, left col., paragraph 1—p. 1571, right col., paragraph 2*.

*Primary Examiner*—Mehmet B. Geckil
*Attorney, Agent, or Firm*—Roland A. Fuller, III

[57] ABSTRACT

Microcontrollers, e.g. those located within a vehicle or factory, are connected over a local area network (LAN). The microcontrollers broadcast messages on the LAN tagged with an identifier (ID) which identifies the contents of the message, rather than a destination address. Microcontrollers on the network are provided with read only memory (ROM) containing a table of message IDs and accompanying data, wherein the table address of each message ID was initially determined by applying a hash function to the ID. Upon receipt of a message, a microcontroller applies the hash function to the message ID. Using the result as a pointer into the table, the microcontroller compares the message ID stored in that pointer location with the received message ID. If they are equal, the microcontroller performs a predetermined function. If the message IDs are not equal, the message is ignored.

17 Claims, 7 Drawing Sheets

INTRA-VEHICULAR LAN AND METHOD OF ROUTING MESSAGES ALONG IT USING HASH FUNCTIONS

BACKGROUND OF THE INVENTION

The present invention relates to message routing within local area networks (LANs) and, more particularly, to the use of hash functions for table lookups by microcontroller modules connected to an intra-vehicular local area network.

In automated factories and other similar environments, it has been found that an efficient method of operating involves distribution of the control functions throughout the environment. This is achieved by utilizing a plurality of remotely located microcomputers that are programmed to handle special functions. In order to coordinate the operation, the microcomputers are connected together over a local area network ("LAN") and one or more supervisory microcomputers may also be connected to the LAN. An example of such a system for use in an automated factory is disclosed in U.S. Pat. No. 4,972,367 of Burke. In this patent there is recognized the problem of reduced performance because of the necessity to transmit numerous messages over the LAN.

Microcontroller modules within a vehicle typically perform many tasks, such as controlling the engine, producing chimes, monitoring various vehicular functions, producing audible messages, etc. Many of these microcontroller modules must communicate with other microcontroller modules within the vehicle. For example, a first microcontroller may recognize a problem, such as low oil pressure, and may need to communicate the existence of the problem to a second microcontroller module that controls the production of audible messages to the driver. Upon receipt of the information, the second microcontroller module produces the audible message.

The need for communication between the microcontroller modules within a vehicle has lead to the introduction of intra-vehicular LANs that provide the microcontroller modules located throughout a vehicle with the means to communicate with each other. As a result, each of the microcontroller modules within the network is required to determine which of the many messages broadcast on the LAN must be acted upon by it.

Whether the LAN is in a factory, a vehicle or other environment, there is a need to overcome the problems of communication between the microcontrollers over the LAN. One method of accomplishing this is to tag the broadcast message with a microcontroller destination address or identifier. In that case, microcontrollers on the LAN examine each incoming message, compare its address with that which was tagged to the message and immediately determine whether the message was meant for it. This scheme, however, does not provide for the case where one message must be acted upon by more than one microcontroller. Further, it is not very flexible. For example, if a function is moved from one microcontroller to another, all the microcontrollers broadcasting messages relating to that function must be modified.

In addition, an address system requires a great deal of computer overhead. For example, a microcontroller that detects a vehicle operating problem must also be programmed to know the appropriate response and the address of the other microcontrollers that need to execute the response. A system with such a heavy overhead is described in U.S. Pat. No. 5,117,458 of Takaragi et al.

To provide a more flexible system with smaller computer overhead, the messages can be tagged with message identifiers (IDs) which identify the message rather than the destination microcontroller. Such a technique is disclosed in U.S. Pat. No. 5,095,480 of Fenner. With this arrangement each microcontroller on the LAN must search a table it maintains which contains all IDs that it must respond to in order to determine if the message is for it. Further, the table may also contain other parameters necessary to properly respond to a particular message. Typically, a microcontroller module will have to respond to more than one type of message with different parameter requirements.

The introduction into motor vehicles of vehicle multiplex networks has resulted in the need for these modules using the network to do a lot of table lookups. The primary need is to find the messages and determine the parameters of the message and locate information how to process the message. Another reason for the table lookups is to process diagnostic requests which often ask for parameter information by means of a parameter ID. Again a table is consulted to find the location of the parameter, its scaling, etc. This increased use of table lookups, especially during the handling of normal multiplex network traffic, means that a non-trivial fraction of a microprocessor's time can be spent doing table lookups. If there were a way to perform these table lookups more quickly, then the microprocessor could spend its time doing more productive work, such as controlling an engine or transmission.

A common method of looking up information in a table is to search linearly. Message IDs and information are stored in a table, typically with the most frequently occurring message IDs stored in the beginning of the table. The entries are examined one by one until a match is found, or until the entire table has been searched and no match has been found. One problem associated with linear table searching is controller or processor overhead, i.e. the microcontroller is spending time performing searches rather than performing its primary job.

The overhead problem in a linear table search can be illustrated by considering a few examples. In the examples that follow the following assumptions are made. The lookup table will have four bytes per entry, one byte for the ID, one byte for the message length and two bytes for the address of the message service routine. The code samples are written in Motorola 68HC11 assembly language. For purposes of comparing execution times of different table look-up methods, the 68HC11 is assumed to be running at 8 MHz so a CPU cycle takes 0.5 microseconds. The tables will have the same information in them regardless of which lookup method is used, but may be ordered differently.

The table lookup code used in a typical vehicle controller is simple loop which compares the received ID with entries in a table. The IDs are typically placed in the table so that the highest frequency messages are located near the beginning of the table. Table 1 shows a typical implementation of a linear table lookup.

TABLE 1

68HC11 CODE FOR LINEAR TABLE LOOKUP

| Line | Cycles | Bytes | Opcode | Operand | Comment |
|---|---|---|---|---|---|
| 1 | 3 | 2 | LDAA | ID | ;GET RECEIVED ID |
| 2 | 3 | 3 | LDX | #TABLE | ;ADDRESS OF BEGINNING OF TABLE |
| 3 | 2 | 2 | LDAB | #LENGTH | ;LENGTH OF TABLE ENTRY |
| 4 | 4 | 2 | CMPA | O,X | ;COMPARE ID WITH TABLE ENTRY |
| 5 | 3 | 2 | BEQ | FOUND | ;VALIDATE LENGTH, CHECKSUM, ETC. |
| 6 | 3 | 1 | ABX | | ;POINT TO NEXT TABLE ENTRY |
| 7 | 4 | 3 | CPX | #TABLEEND | ;END OF TABLE? |
| 8 | 3 | 2 | BNE | LINE 4 | ;NOT YET |
| 9 | 3 | 2 | BRA | NOT FOUND | ;ID NOT IN TABLE, IGNORE |
| | | | . . . | | ;VALIDATE LENGTH, CHECKSUM, ETC. |
| Total | 28 | 19 | | | |

The table indicates the time required to process an ID. Note that the first 3 lines set up the loop and take 4 microseconds to execute. Lines 4–8 (8.5 microseconds) are executed once for every table entry that does not match the received ID until the entire table is checked. Thus the total time to process an ID which is not in the table is 4+8.5×(# table entries). For example, for 12 table entries it would be 106 microseconds. Some vehicle controllers have 20 IDs to receive so it would take them 174 microseconds, worst case, to process a received ID. That is a long time to be tied up for a real time controller.

A rough estimate of the percentage of the processor's time that can be wasted looking up ID's can be made. Assuming that the average message is three bytes long, that the LAN bit rate is 7812.5 bits per second and that the bus is busy 35% of the time, there will be about 68 messages per second transmitted on the bus. If 106 microseconds are used 68 times a second then the processor is spending over 0.7% of its time just sorting messages from the LAN. If 174 microseconds are used, the number becomes almost 1.2%. Note that these are worst case numbers. In reality, no module ignores all of the messages on the bus, so some of the IDs will be found in the table before the maximum time is used. In addition, a module will not have to process any messages that it transmits.

"Hashing" has been found to be an efficient means to search a table. With hashing an arithmetic function, or hash function, is used to create a key related to the message ID. If the hash function is applied to a received ID that has been hash coded, the result is a pointer into a table maintained for the microcomputer which indicates the section of the message. Methods of arriving at an appropriate hash function for a given application are well known. Examples of these methods are described in two papers, incorporated herein by reference: Jaeschke, G., *Reciprocal Hashing: A Method for Generating Minimal Perfect Hashing Functions*, Comm. ACM 24,12 (December 1981) 829–833; and Sprugnoli, R., *Perfect Hashing Functions: A Single Probe Retrieving Method for Static Sets*. Comm. ACM 20,11 (November 1977) 841–850.

The basic idea of hashing is to take the item you want to find in the table and perform some numerical computation (the hash function) on it to get a table address. Hash functions have been used since the earliest days of computers to perform table lookups. They have been used most often on mainframe computers for compilers and databases, and there is extensive literature on different ways to use them. But a mainframe is much different than a microcontroller: the memory for storing the tables is much larger, there are peripheral storage devices and the CPU has a full complement of fast, high precision arithmetic instructions. Furthermore, many existing hash functions are designed for dynamic systems, where items are being added and taken away from the table.

SUMMARY OF THE INVENTION

The present invention is directed to reducing microcomputer or microcontroller overhead for communication over a LAN, while still providing flexibility in the assignment of tasks in a distributed control environment. This purpose is achieved by using messages on the LAN that have static identifiers and having the microcontrollers detect their messages by using particular hash functions with local message tables.

In an illustrative embodiment of the present invention, a plurality of microcontrollers are connected together over a LAN and provide distributed control and operation of some environment, e.g. a factory or a motor vehicle. A microcontroller which has a message to report, or needs some service from another microcontroller, broadcasts a message on the LAN tagged with an identifier (ID) which identifies the contents of the message, rather than a destination address. Microcontrollers on the network are provided with read only memory (ROM) that contain a table of message IDs and accompanying data about how to respond to the message. Rather than linearly checking the table to see if the ID matches an ID in its table, the microcontroller applies a hash function to the ID, the result of which is a table address in the ROM. Thus, instead of searching the table for a matching ID, the hash function is applied and the results used as a pointer into the table. The microcontroller compares the message ID stored in that pointer location with the received message ID. If they are equal, the microcontroller performs the predetermined function. If the message IDs are not equal, the message is ignored.

In preferred embodiments, linear congruential, multiplicative XOR, linear congruential with XOR and reciprocal hashing functions are used with the microcomputers of an intra-vehicular LAN.

BRIEF DESCRIPTION OF THE DRAWINGS

The foregoing and other features of the present invention will be more readily apparent from the following detailed description of preferred embodiments taken in conjunction with the accompanying drawings wherein.

DETAILED DESCRIPTION OF PREFERRED EMBODIMENTS

Figure 1:
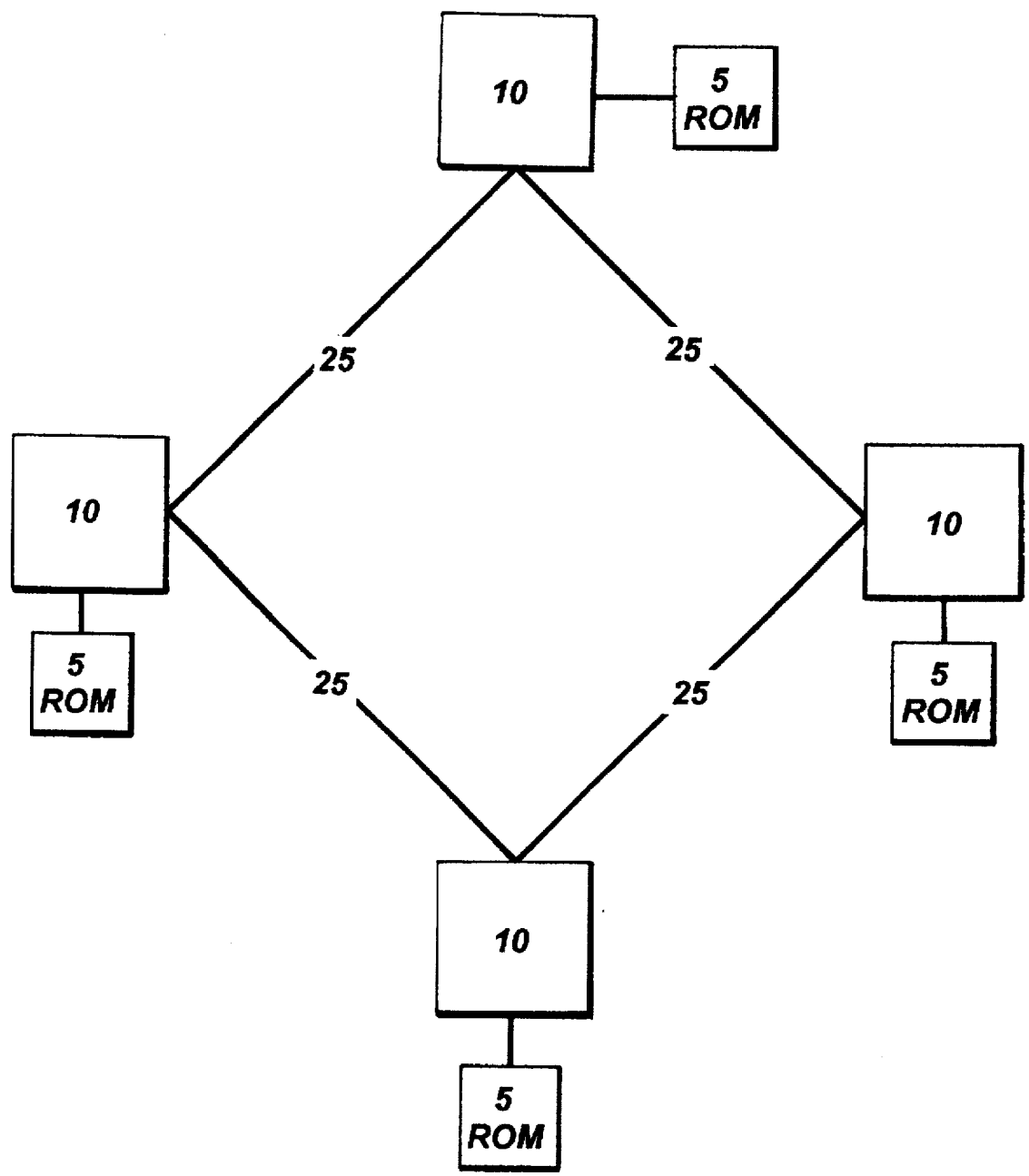
FIG. 1 is a block diagram of the intra-vehicular LAN of the present invention.

FIG. 1 illustrates microcontroller modules 10 on an intra-vehicular LAN 25. These microcontrollers individually control certain operations of the vehicle, e.g. engine operation or the reporting of certain conditions. As a result, the microcontrollers generate messages which may call for further operations of other microcontrollers or may merely report status. These output messages are not addressed to any particular microcontroller on the LAN, but are provided with messages IDs which indicate the type of message. It is then up to the other microcontrollers to determine if they are required to take some action based on the message. This is determined by the microcontroller checking to see if a message with this ID is stored in a table associated with the microcontroller. Each microcontroller 10 is provided with a static memory or ROM 5 which contains a table of messages. The messages are stored and retrieved in the tables in ROMs 5 using a hash function.

Figure 2:
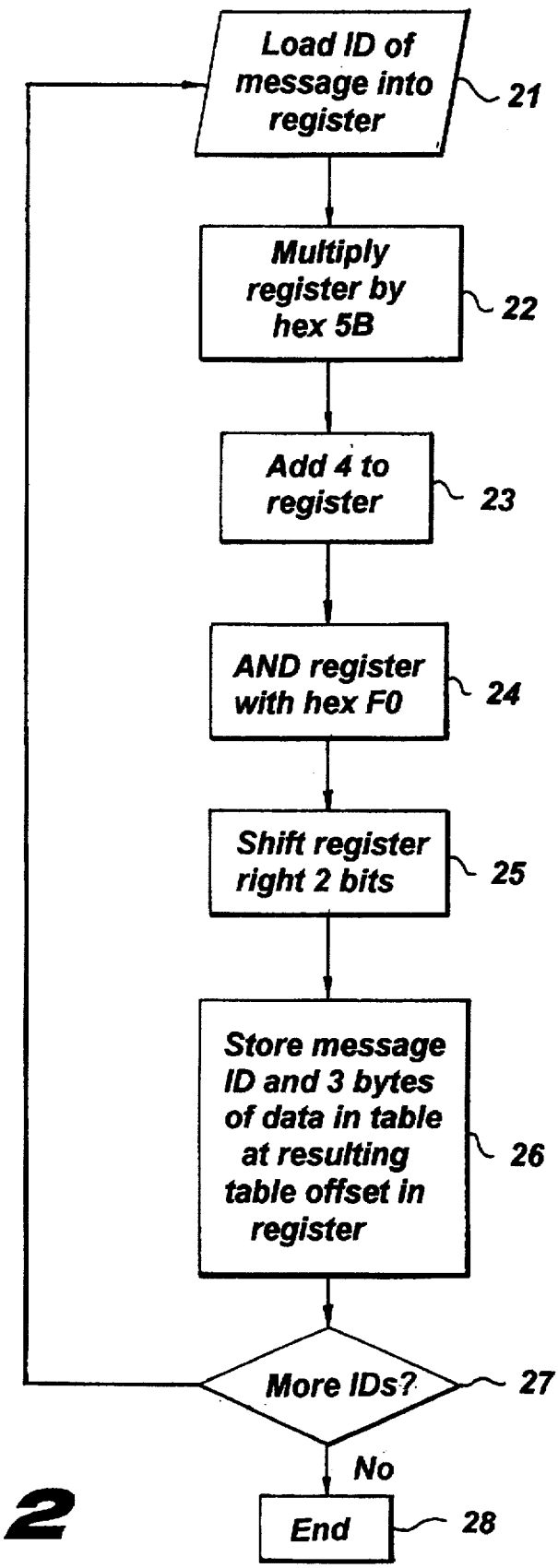
FIG. 2 is a flowchart of a method of storing message identifiers using hash functions.

FIG. 2 is a flow chart of a preferred embodiment of a method of storing message identifiers, i.e. a hash function. The function, as illustrated, is a linear congruential hashing function wherein the hash function is in the following form:

$$index = (A*ID) + B$$

where the numerical value of A and B depend on the IDs to be stored, the table size, and the table entry sizes. Table 2 is similar to Table 1 and shows how to use the hash function.

beginning of the table. Finally, lines 10–12 compare the received ID with the table entry. If they match, then the message is processed according to the information in the table; if not, then the message can be ignored. It is necessary to compare the received ID with the ID in the table because the hash function is a many-to-one function. In this example, 256 possible IDs are mapped into a table of 16 entries so that several IDs will map into each table entry. However, only one of the IDs in the list of IDs received by the module will map into any given table entry.

There are no loops or branches in the code so it processes all IDs, regardless of whether they are in the table or not, in the same amount of time, i.e. 19.5 microseconds. This linear congruential hash function method becomes competitive with the prior art linear search method of Table 1 in terms of execution time when there are 2 or more entries in the table. For the 12 entry table discussed above, the congruential hash function method of the present invention is 5 times as fast as the linear table search of the prior art (i.e. Table 1).

To further illustrate the method, we assume a vehicle controller has 12 hexadecimal ("hex") IDs. The linear congruential hash function, wherein A=hex 5B and B=4 illustrates a perfect hash function for the following list of 12 IDs to be input:

02 50 56 84 8C A4 B2 B4 CA DA E4 EC.

If ID A4 is received by a microcontroller, it then is multiplied by 5B (resulting in hex 3A4C) and is added to get 3A50. Line 5 of Table 2 eliminates everything but the highest four bits of the low byte of this product and the subsequent lines adjust the result to properly index a table of 4 byte entries. This is the same as extracting the second hexadecimal digit from the right which is 5 and using it as an offset into the table given above. Counting from 0, A4 is at entry five in the table. The other IDs also generate offsets using this formula, which is what is required for a perfect hash function; there are 12 IDs but the table is 16 entries long. Since 00 is an illegal ID, unused table entries are filled with 00.

TABLE 2

| 68HC11 CODE FOR LINEAR CONGRUENTIAL HASHING | | | | | |
|---|---|---|---|---|---|
| Line | Cycles | Bytes | Opcode | Operand | Comment |
| 1 | 3 | 2 | LDAA | ID | |
| 2 | 2 | 2 | LDAB | #A | |
| 3 | 10 | 1 | MUL | | |
| 4 | 2 | 2 | ADDB | #B | ;INDEX IS HIGH BITS OF REG B |
| 5 | 2 | 2 | ANDB | #$F0 | ;PICK OUT BITS FOR 16 ENTRY TABLE |
| 6 | 2 | 1 | LSRB | | ;Divide by 2 |
| 7 | 2 | 1 | LSRB | | ;Divide by 2 (ASSUMES 4 BYTE TABLE ENTRIES) |
| 8 | 3 | 3 | LDX | #TABLE | |
| 9 | 3 | 1 | ABX | | |
| 10 | 4 | 2 | LDAA | 0,X | |
| 11 | 3 | 2 | CMPA | ID | |
| 12 | 3 | 2 | BNE | NOT FOUND | ;ID NOT IN TABLE, IGNORE ;VALIDATE LENGTH, CHECKSUM, ETC. |
| Total | 39 | 21 | | | |

Lines 1–4 of Table 2 are implemented in a straightforward fashion, leaving the index bits in the upper part of register B. Line 5 extracts the index for a table with 16 entries and lines 6–7 move the index into the proper position to address a table with four byte entries. Lines 8–9 add the index to the It is always possible to find a perfect hash function given a large enough table; for example, if the IDs are 8 bits long then the ID can be used as an address in a 256 entry table. However, depending on the set of IDs for which a hash function is sought, there is no guarantee that a perfect hash function for a table of reasonable size will be found. Similarly, if there is a severe space constraint, it may be desirable to use a small table which does not contain all of the necessary IDs. In such cases, it is simple to have hard coded checks for the few IDs which do not work with the desired hash function. Still, the Linear Congruential hash function works remarkably well with ID lists from real world microcontroller applications.

Referring to the flowchart of FIG. 2, the implementation of Table 2 in software is illustrated. At step 21, an ID is loaded into a register. The register is next multiplied by hex 5B (Step 22) and 4 is added (Step 23). Next, the register is ANDed in Step 24 with hex F0, thereby retaining only the upper four bits or nibble of the low order byte. These bits represents the order number in which the ID should be stored, e.g. if the nibble is 5, the ID should be the sixth entry in the table (assuming the first entry is 0). Next, the offset from the beginning of the table must be calculated. Thus the nibble must be multiplied by the size of the entry, which is four bytes. Since at Step 24 the index is still in the upper nibble of the low order byte, the register is shifted right two bits in Step 25, instead of dividing by 16 then multiplying by four. However, it gives the same results. The register contents now contain the address offset from the beginning of the table where the ID and accompanying data should be stored.

Figure 3:
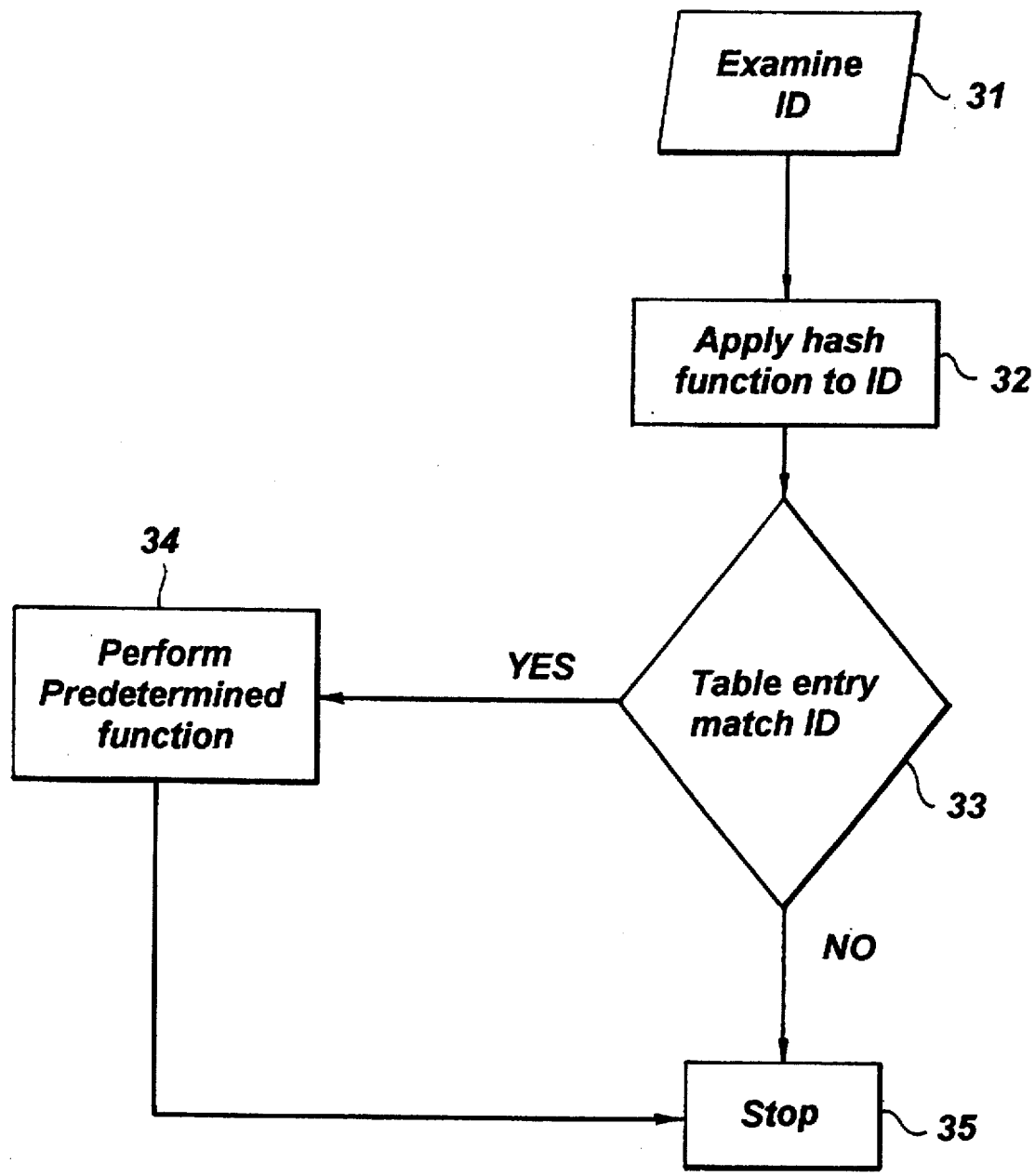
FIG. 3 is a flowchart of a method for determining whether a message should be acted upon.
Figure 4:
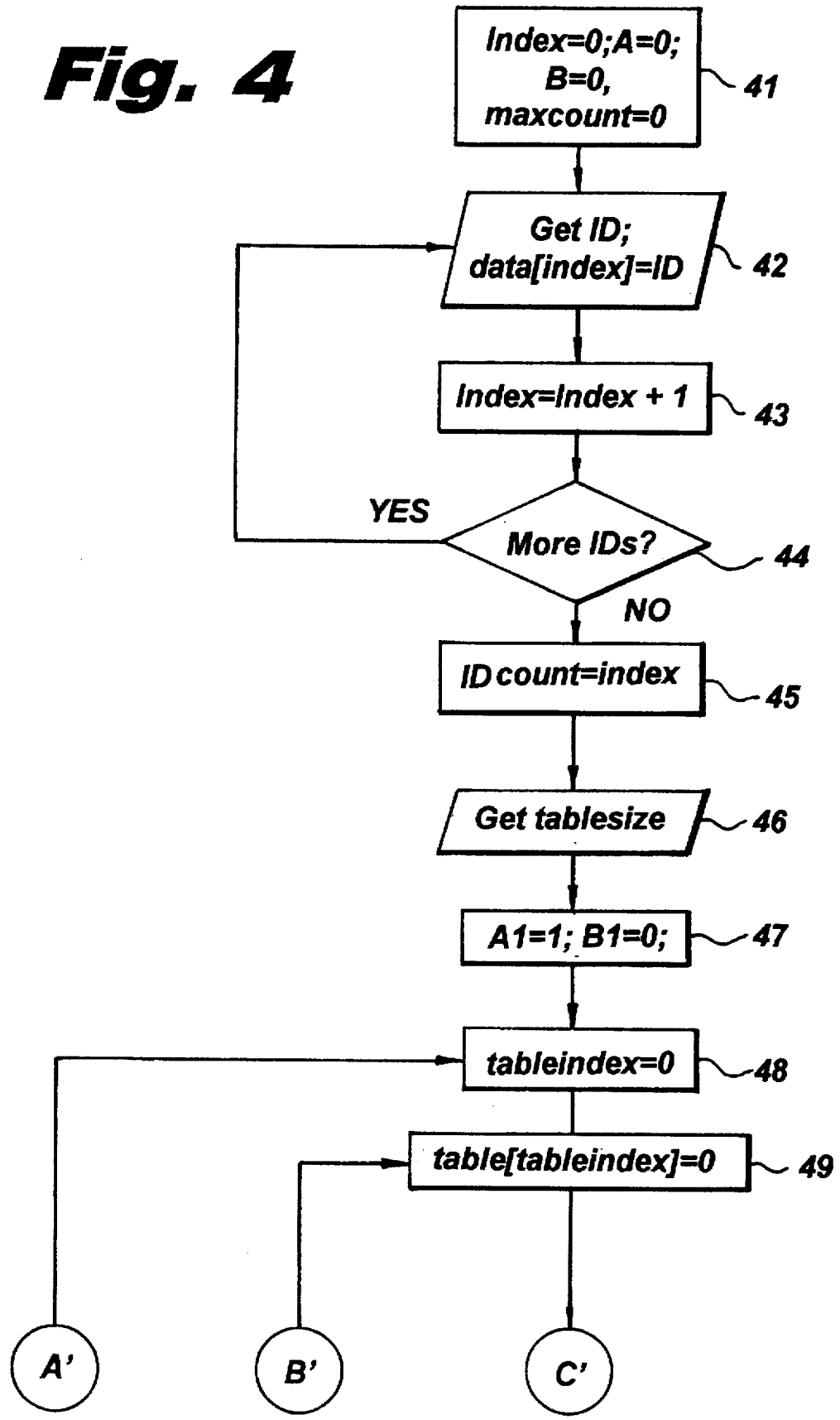
FIGS. 4-7 are a flowchart of a method for determining the parameter values for a Linear Congruential Hash function.
Figure 5:
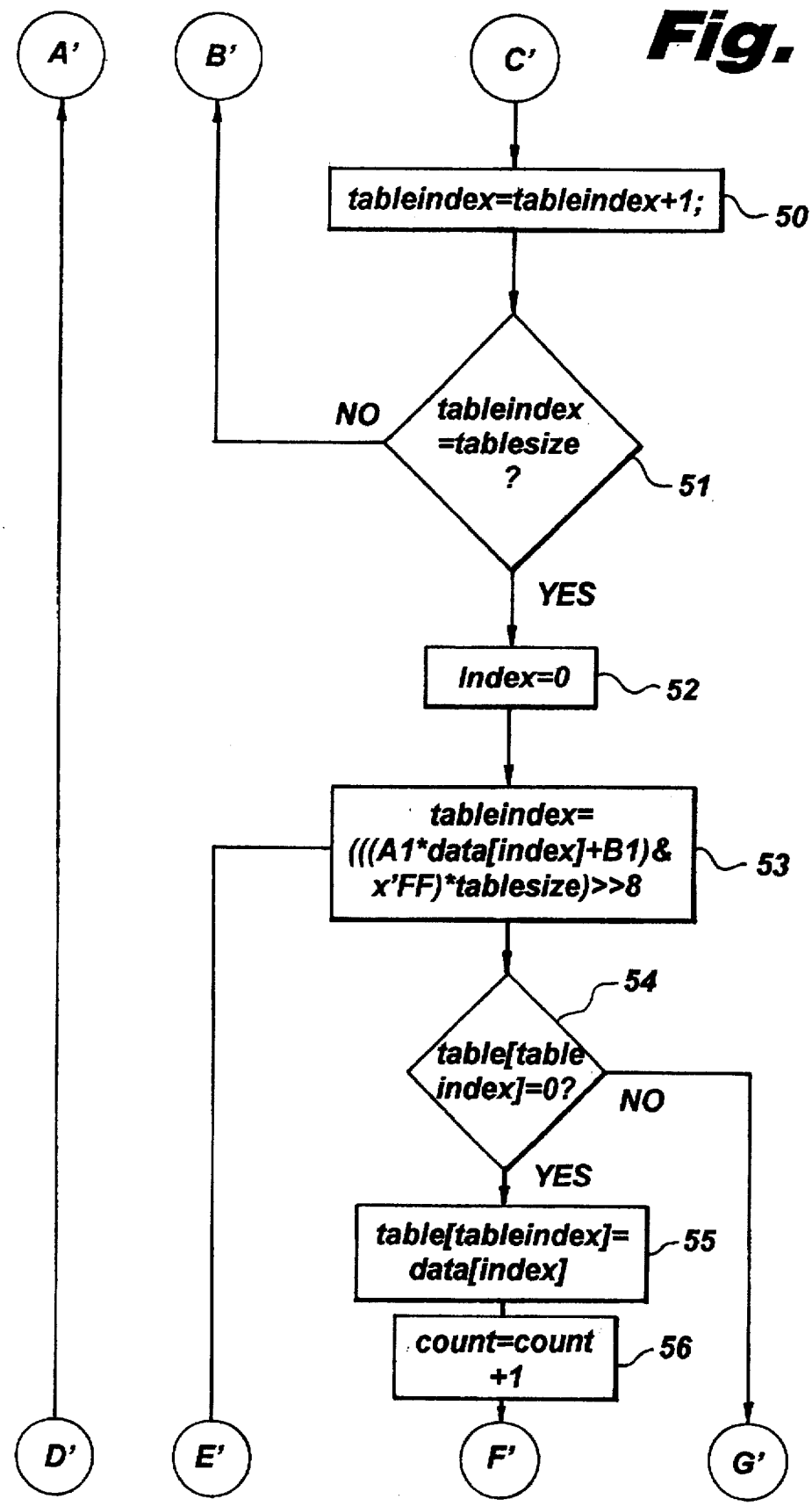
Figure 6:
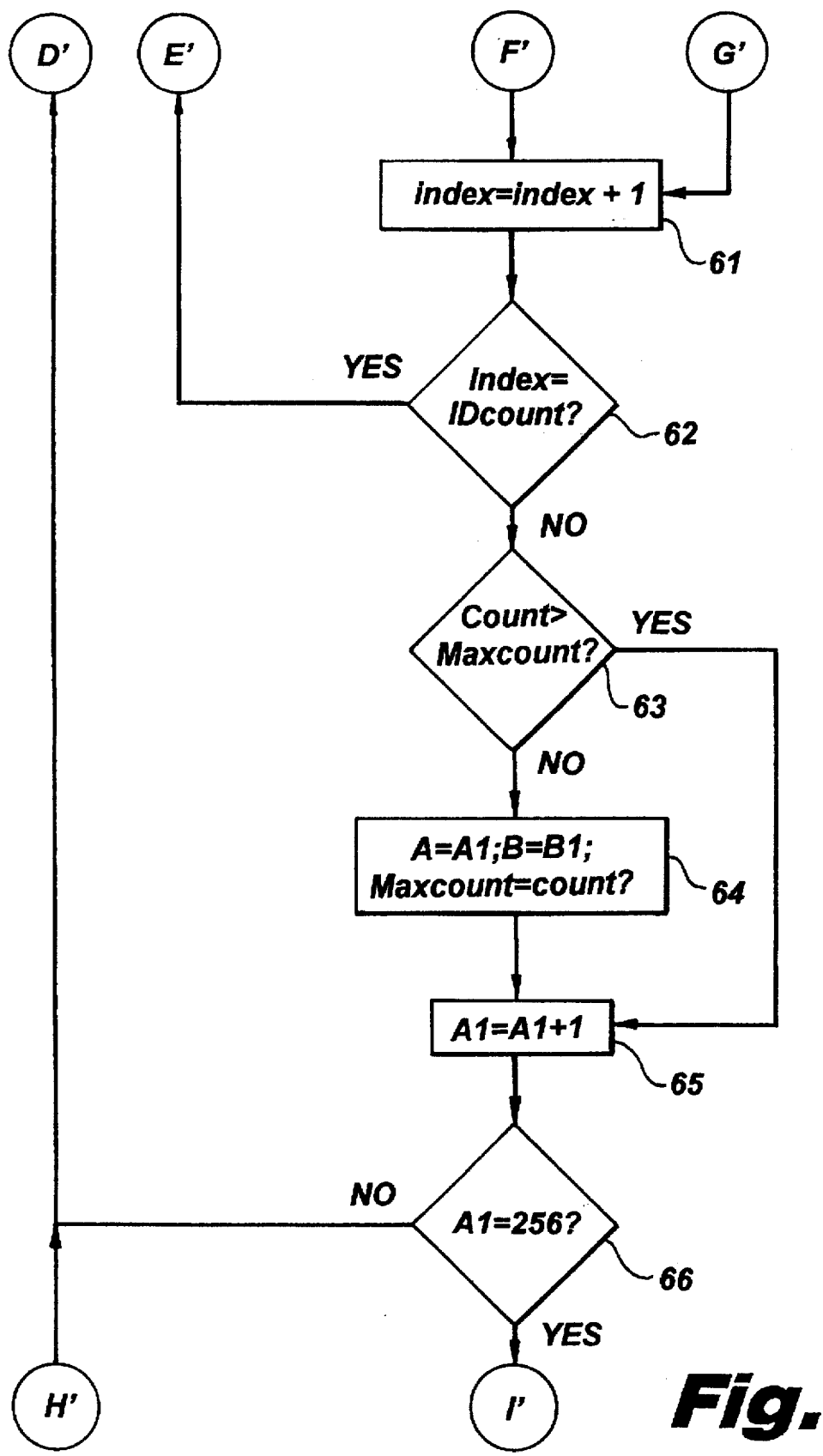
Figure 7:
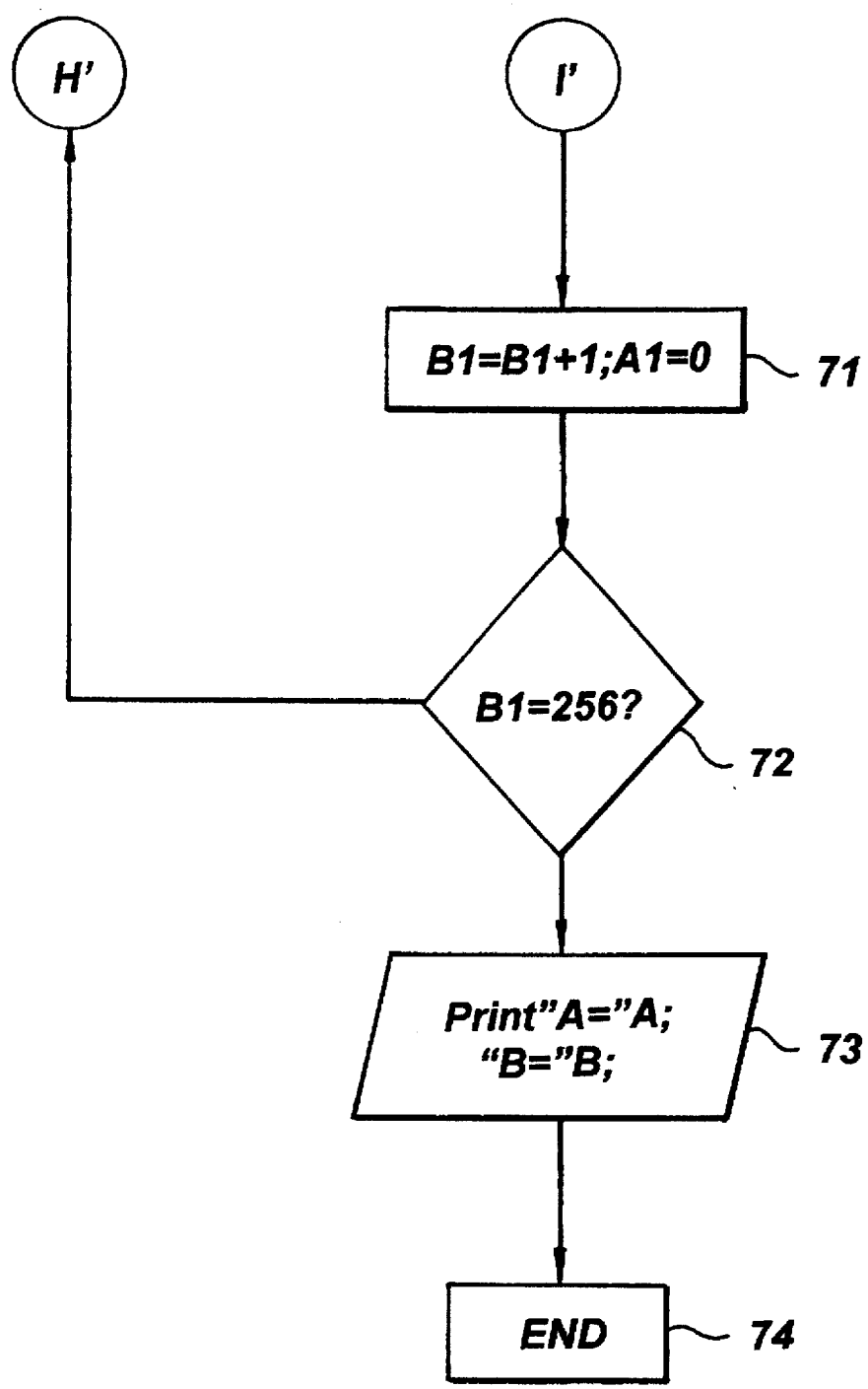

Once the IDs are stored, a microprocessor can begin to examine message IDs broadcast on the LAN and determine whether it is required to react in response thereto. FIG. 3 is a flowchart illustrating how this determination is made. Each microprocessor examines the message ID broadcast on the network (Step 31). Next, the microprocessor applies the appropriate hash function to the ID (Step 32). Using the output of the function as an offset address, the microprocessor compares the received message ID to the message ID stored at that offset address (Step 33). If there is a match, the microprocessor performs the corresponding function (Step 34), otherwise the message is ignored (Step 35).

As Table 3 shows, the Linear Congruential Hashing Method is able to produce a minimal perfect hash function for one vehicle controller and near minimal perfect hash functions for other modules. The "All but 2 fitted" and "All but 1 fitted" columns show that sometimes a much smaller table can be used if all of the IDs are not handled via the hash function. In particular, a if table size of 27 is needed for a perfect hash function, a table size of only 18 is needed for a near perfect hash function which handles 16 of the 18 IDs.

TABLE 3

Smallest table size required to achieve various
levels of fit using Linear Congruential Hashing

| Application | IDs | All but 2 fitted | All but 1 fitted | All Fitted |
| --- | --- | --- | --- | --- |
| Controller #1 | 8 | 8 | 8 | 8 |
| Controller #2 | 12 | 12 | 12 | 16 |
| Controller #3 | 18 | 18 | 21 | 27 |
| Controller #4 | 20 | 21 | 21 | 21 |
| Controller #5 | 20 | 21 | 23 | 23 |

The example code assumes that the table size is 16 and that the record size is a power of 2. These need to be generalized. For other table sizes which are a power of two, AND function can still be used to extract the index bits if the constant in line 5 of Table 2 is changed so that the number of bits extracted is $\log_2$ (table Size). For example, if the table size were 32 then the constant should be $F8. The case where the table size is not a power of two requires a little more code to handle, i.e. line 5 in Table 2 must be replaced with the following lines:

| Line | Cycles | Bytes | Opcode | Operand | Comment |
| --- | --- | --- | --- | --- | --- |
| 5 | 2 | 2 | LDAA | #TblSize | ;EXTRACT TABLE INDEX |
| 5A | 10 | 1 | MUL | | |
| 5B | 2 | 1 | TAB | | |

If the record size is not a power of two, then lines 6 and 7 of Table 2 must be replaced with the following lines:

| Line | Cycles | Bytes | Opcode | Operand | Comment |
| --- | --- | --- | --- | --- | --- |
| 6 | 2 | 2 | LDAA | #RecSize | ;POINT TO DESIRED RECORD |
| 7 | 10 | 1 | MUL | | |
| 7A | 2 | 1 | TAB | | |

In certain situations it may be possible to combine these two multiply operations by the step of multiplying once by the constant TblSize * RecSize.

These generalizations add instructions to the hash function. On the other hand, it may be possible to find a hash function which has one or more parameters which are zero. In those cases, the instructions which implement those parameters can be eliminated.

It will be understood by those skilled in the art that there are many known hash function other than those illustrated that can be utilized. Another known hash function is a Multiplicative exclusive OR ("XOR") function having the form:

$$index = (A * ID) \wedge B$$

where $\wedge$ A represents the XOR operation. To code this function, simply replace the ADD instruction in line 4 of Table 2 with an XOR instruction. Table 5 shows the effectiveness of the Multiplicative XOR method.

TABLE 5

Smallest table size required to achieve various
levels of fit using Linear Congruential Hashing

| Application | IDs | All but 2 fitted | All but 1 fitted | All Fitted |
| --- | --- | --- | --- | --- |
| Controller #1 | 8 | 8 | 8 | 8 |
| Controller #2 | 12 | 12 | 12 | 13 |
| Controller #3 | 18 | 18 | 19 | 22 |
| Controller #4 | 20 | 20 | 20 | 21 |
| Controller #5 | 20 | 20 | 21 | 23 |

Still another has function is called Linear Congruential with XOR. It combines the ideas from the first two functions. Its form is $$index = (A * ID) \wedge B$$

where $\wedge$ represents the XOR operation. To code this function, simply add the following instruction after line 4 of Table 2.

| Line | Cycles | Bytes | Opcode | Operand | Comment |
| --- | --- | --- | --- | --- | --- |
| 4A | 2 | 2 | XORB | #C | ;APPLY THIRD HASH FUNCTION PARAMETER |

This function is more effective than either Linear Congruential or Multiplicative XOR hashing at the expense of a longer search time and a little more execution time. Here is how this function performs on the test data sets.

TABLE 6

Smallest table size required to achieve various levels of fit using Linear Congruential with XOR Hashing

| Application | IDs | All but 2 fitted | All but 1 fitted | All Fitted |
|---|---|---|---|---|
| Controller #1 | 8 | 8 | 8 | 8 |
| Controller #2 | 12 | 12 | 12 | 13 |
| Controller #3 | 18 | 18 | 18 | 19 |
| Controller #4 | 20 | 20 | 20 | 21 |
| Controller #5 | 20 | 20 | 20 | 22 |

There is one more type of hash function to mention, Reciprocal Hashing. This hash function has several points against it:

- It uses a divide instruction, which is much less common in microcontrollers than the multiply instruction.
- Division, even if it is available, takes much longer to perform than multiplication (41 cycles versus 10 cycles in the MC68HC11).
- If the table size is not a power of 2, then two divisions are required.
- It is only about as effective as the simpler hash functions.

Still, it is worth mentioning because it may be useful in some situations. This hash function technique is fully described in the article "*Reciprocal Hashing: A Method for Generating Minimal Perfect Hashing Functions*" by G. Jaeshke in Communications of the ACM, Volume 24, Number 12 (December 1981). The equation describing this method is:

$$index = (A/ID) \bmod (table\ size)$$

The MC68HC11 implementation of this method for a 16 element table is shown in Table 7.

TABLE 7

68HC11 Code for Reciprocal Hashing

| Line | Cycles | Bytes | Opcode | Operand | Comment |
|---|---|---|---|---|---|
| 1 | 2 | 1 | CLRA | | |
| 2 | 3 | 2 | LDAB | ID | |
| 3 | 3 | 1 | XGDX | | |
| 4 | 3 | 3 | LDD | #A | |
| 5 | 41 | 1 | IDIV | | |
| 6 | 3 | 1 | TXD | | |
| 7 | 2 | 2 | ANDB | #$F0 | ;PICK OUT BITS TO USE FOR INDEX |
| 8 | 3 | 1 | TXD | | |
| 9 | 3 | 3 | LDX | #TABLE | |
| 10 | 3 | 1 | ABX | | |
| 11 | 4 | 2 | LDAA | 0,X | |
| 12 | 3 | 2 | CMPA | ID | |
| 13 | 3 | 2 | BNE | NOT FOUND | ;ID NOT TABLE, IGNORE |
| | | | ... | | ;VALIDATE LENGTH, CHECKSUM, ETC. |
| Total | 76 | 22 | | | |

As Table 8 shows, it is somewhat less effective at finding perfect hash functions than the Linear Congruential with XOR method described earlier.

TABLE 8

Smallest table size required to achieve various levels of fit using Reciprocal Hashing.

| Application | IDs | All but 2 fitted | All but 1 fitted | All Fitted |
|---|---|---|---|---|
| Controller #1 | 8 | 8 | 8 | 8 |
| Controller #2 | 12 | 12 | 12 | 12 |
| Controller #3 | 18 | 18 | 18 | 20 |
| Controller #4 | 20 | 21 | 24 | 28 |
| Controller #5 | 20 | 21 | 21 | 22 |

In order to make use of the above described techniques, you need some method for finding the appropriate hash functions. FIGS. 4–7 illustrate a brute force method for finding the parameter values appropriate for a given set of IDs using a Linear Congruential Hash function.

Referring to FIGS. 4–7, parameter indexes, A, B, and maxcount are initialized (Step 41). A and B will ultimately contain the parameters appropriate for the given set of IDs. The entire set of IDs are then read into an array (Steps 42–44). A1 and B1 are then initialized (Step 47) and will hold parameter values being tested. Next, the entire table is initialized with all table entries set to zero (Steps 48–51). Using A1 and B1 as the parameter values, and using each ID, table indexes are calculated using a Linear Congruential hash formula (Steps 53–62). For each index, if the table entry at that index is zero, the ID is stored in the table entry (Steps 54–55) and counted. If the number of entries stored is greater than the total count of the IDs stored using another set of parameter values, A is set to A1 and B is set to B1, and the count is saved (Steps 63–64). A1 is then incremented (Step 65), the table entries are reinitialized (Steps 48–51) and the IDs are all tested again (Steps 53–62). This continues until A1 is 256 (Step 66). A1 is then set to zero and B1 is then incremented (Step 71). The table entries are reinitialized (Steps 48–51), and the IDs are tested (Steps 53–62). This process continues until all combinations of possible A1 and B1 values are tested. After they have all been tested, A and B will contain the best parameter values for a Linear Congruential Hash function.

It should be obvious to one skilled in the art that the flowchart in FIGS. 4–7 may be used for the other described hash functions, with some modification.

While the present invention has been particularly shown and described with reference to preferred embodiments thereof, it will be understood by those skilled in the art that various changes in form and details may be made therein without departing from the spirit and scope of the invention.

What is claimed is:

1. A control system comprising:

at least two microcontrollers for processing information to control parts of the system, each said microcontroller generating messages while processing the information which are related to the status of said controlled parts and receiving messages related to the status of said controlled parts of the system controlled by another microcontroller, each such message being identified with a message identifier;

memory means associated with each microcontroller, said memory means storing a table of message identifiers which the associated microcontroller is capable of processing and related instructions for processing the message;

a local area network connecting said at least two microcontrollers, said local area network transmitting messages to all said at least two controllers; and means at each microcontroller for applying a hash function to the identifier of each message received over the local area network in order to generate a table index which directs the microcontroller to a particular entry in the table stored in the memory means, comparing the message identifier at the particular entry to the message identifier of the message received, and causing the microcontroller to respond to the message if the identifiers match.

2. The control system of claim 1 wherein the at least two microcontrollers and the local area network form an intra-vehicular control system for a vehicle.

3. The control system of claim 1 wherein the hash function is a linear congruential hash function.

4. The control system of claim 2 wherein the hash function is a linear congruential hash function.

5. The control system of claim 1 wherein the hash function is a multiplicative exclusive OR hash function.

6. The control system of claim 2 wherein the hash function is a multiplicative exclusive OR hash function.

7. The control system of claim 1 wherein the hash function is a reciprocal hash function.

8. The control system of claim 2 wherein the hash function is a reciprocal hash function.

9. The control system of claim 1 wherein the microcontrollers are programmed microprocessors.

10. In a microprocessor-based local area network, a method by which a first microprocessor on the network determines whether a message with a message identifier broadcast on the network by a second microprocessor on the network is one to which said first microprocessor must respond, the first microcontroller having memory, the memory storing a hash table of message identifiers and related information at each microprocessor on the network, the method comprising:

examining said broadcast message for said identifier;

determining a hash table index by applying a predefined hash function to said identifier;

using said hash table index to determine a location within said hash table;

comparing an entry stored in said hash location with said message identifier; and performing a predetermined function if said entry and said message identifier are the same.

11. The method of claim 10 wherein the network is an intra-vehicular local area network which controls operation of a vehicle.

12. The method of claim 10 wherein said hash function is a linear congruential hash function.

13. The method of claim 10 wherein the network is an intra-vehicular local area network which controls operation of a vehicle.

14. The method of claim 10 wherein said hash function is a Multiplicative XOR function.

15. The method of claim 10 wherein the network is an intra-vehicular local area network which controls operation of a vehicle.

16. The method of claim 10 wherein said hash function reciprocal hash function.

17. The method of claim 10 wherein the network is an intra-vehicular local area network which controls operation of a vehicle.

* * * * *